US008620337B2

(12) United States Patent
Meredith et al.

(10) Patent No.: US 8,620,337 B2
(45) Date of Patent: Dec. 31, 2013

(54) SELECTIVE ESTABLISHMENT OF RADIO ACCESS BEARERS TO SUPPORT SIMULTANEOUS VOICE AND DATA COMMUNICATIONS IN A MOBILE TELECOMMUNICATIONS NETWORK

(75) Inventors: Sheldon Meredith, Marietta, GA (US); Mark Austin, Roswell, GA (US); Mario Kosseifi, Roswell, GA (US)

(73) Assignee: AT&T Mobility II LLC, Altanta, GA (US)

( * ) Notice: Subject to any disclaimer, the term of this patent is extended or adjusted under 35 U.S.C. 154(b) by 157 days.

(21) Appl. No.: 13/088,731

(22) Filed: Apr. 18, 2011

(65) Prior Publication Data

US 2012/0264397 A1 Oct. 18, 2012

(51) Int. Cl.
*H04W 72/00* (2009.01)
*H04W 4/00* (2009.01)
*H04M 11/10* (2006.01)
*H04M 11/00* (2006.01)
*H04B 7/00* (2006.01)
*H04B 1/38* (2006.01)
*H04L 12/16* (2006.01)
*H04L 12/66* (2006.01)
*H04L 12/28* (2006.01)
*H04J 3/02* (2006.01)
*H04J 1/02* (2006.01)
*H04N 7/14* (2006.01)

(52) U.S. Cl.
USPC ............ 455/450; 455/13; 455/466; 455/509; 455/516; 455/563; 370/260; 370/352; 370/355; 370/420; 370/538; 370/395.61; 370/493; 370/494; 370/495; 348/14.02; 348/14.09; 348/14.1; 379/90.01; 379/93.01; 379/93.09; 379/93.21

(58) Field of Classification Search
USPC .......... 455/61, 416, 423, 425, 450, 453, 509, 455/511, 517, 557, 558, 556.1, 67.7, 466, 455/516, 563, 413; 370/260–261, 352, 370/354–355, 493, 535, 538, 227, 382, 389, 370/395.61, 420, 494, 495; 348/14.02, 348/14.09, 14.1; 379/9, 90.1, 93.01, 93.21, 379/93.09, 90.01, 93.14
See application file for complete search history.

(56) References Cited

U.S. PATENT DOCUMENTS

| | | | |
|---|---|---|---|
| 6,016,311 A * | 1/2000 | Gilbert et al. ................. 370/280 |
| 7,509,129 B2 * | 3/2009 | Sinivaara ...................... 455/453 |
| 8,346,274 B2 * | 1/2013 | Sane et al. .................. 455/452.2 |
| 2003/0224815 A1 * | 12/2003 | Rodman et al. ............... 455/517 |
| 2005/0250534 A1 * | 11/2005 | Maurer ...................... 455/556.1 |
| 2006/0013164 A1 * | 1/2006 | Paryani ........................ 370/329 |
| 2008/0039106 A1 | 2/2008 | Wallentin et al. |
| 2010/0165948 A1 | 7/2010 | Ore et al. |
| 2010/0279679 A1 * | 11/2010 | Young et al. .................. 455/423 |
| 2011/0294485 A1 * | 12/2011 | Slack ............................ 455/418 |
| 2012/0083264 A1 * | 4/2012 | Ramasamy et al. .......... 455/425 |
| 2012/0302223 A1 | 11/2012 | Austin et al. |

* cited by examiner

*Primary Examiner* — Inder Mehra
(74) *Attorney, Agent, or Firm* — Hartman & Citrin LLC

(57) ABSTRACT

Systems, methods, and computer-readable media are for selectively establishing radio access bearers configured to support simultaneous voice and data communications in a mobile telecommunications network. An exemplary method includes receiving a request to initiate a data session at a mobile device that is currently engaged in a voice session and, in response to receiving the request, determining if the mobile device is capable of supporting a radio access bearer configured to simultaneously support the data session and the voice session. The method further includes allowing or denying establishment of the radio access bearer based upon the determination.

20 Claims, 12 Drawing Sheets

SELECTIVE ESTABLISHMENT OF RADIO ACCESS BEARERS TO SUPPORT SIMULTANEOUS VOICE AND DATA COMMUNICATIONS IN A MOBILE TELECOMMUNICATIONS NETWORK

BACKGROUND

This application relates generally to establishing radio access bearers in a mobile telecommunications network and, more particularly, to selectively establishing radio access bearers to support simultaneous voice and data communications in a mobile telecommunications network.

Some mobile telecommunications networks, such as those based upon Universal Mobile Telecommunications System ("UMTS"), utilize a bearer service called a radio access bearer ("RAB") to establish voice and/or data connections between a mobile device and a core network. UMTS permits the simultaneous transmission of voice and data content over a special-purpose RAB called a multi-RAB (also called an "mRAB"). When a subscriber is using their mobile device for voice communications and the network has data to transmit to the mobile device, the network and the mobile device jointly establish an mRAB to support simultaneous transmission of voice and data content. Similarly, an mRAB can be established if the subscriber takes actions to initiate a data transfer, such as by initiating a download or launching an application that relies on a data connection to populate its content.

Communications over an mRAB are not without complications. For example, a mobile device using an mRAB for voice and data communications is required to supply sufficient uplink transmit power to support both the voice and data components of the mRAB. Under some conditions, such as when the mobile device is approaching the edge of network coverage, the mobile device may use all or at least a majority of its available uplink transmit power to maintain acceptable voice quality for a voice call. When an mRAB is invoked to transfer data, the radio link budget is impaired by several decibels, at which point the mobile device can no longer support both the voice and data components. If either component fails, the mRAB is torn down, resulting in a dropped call. The subscriber is likely unaware of the underlying mechanisms that forced their call to be dropped, particularly for scenarios in which a background service, such as an email push, forced establishment of the mRAB while the subscriber was on the call.

Recent performance trends in UMTS-based networks have shown that the number of dropped voice calls due to mRAB connections can be several times the number of dropped voice calls when a voice-only RAB is used. Mobile network operators may want to promote their competitive advantage in offering wireless service that allows simultaneous voice and data. In doing so, however, these mobile network operators may also exacerbate the aforementioned problems leading to a higher frequency of dropped calls and, as a result, reduced consumer confidence, bad press, decreased subscriber retention, and revenue loss.

SUMMARY

Systems, methods, and computer readable media are described herein for selectively establishing mRABs in a mobile telecommunications network. By selectively establishing mRABs, the number of dropped calls in the mobile telecommunications network can be significantly reduced.

According to one aspect presented herein, a method for selectively establishing radio access bearers includes receiving a request to initiate a data session at a mobile device that is currently engaged in a voice session and, in response to receiving the request, determining if the mobile device is capable of supporting a radio access bearer configured to simultaneously support the data session and the voice session. The method further includes allowing or denying establishment of the radio access bearer based upon the determination.

In some embodiments, the data request is a device-initiated data request generated by the mobile device in response to instructions from an application residing on the mobile device. In other embodiments, the data request is a user-initiated data request generated by the mobile device in response to a direct user input. In still other embodiments, the data request is a network-initiated request received in response to an entity external to the mobile device taking an action to invoke an operation on the mobile device that at least temporarily requires a data connection.

In some embodiments, the method further includes measuring a statistic of the mobile device. In these embodiments, determining if the mobile device is capable of supporting the radio access bearer includes determining if the mobile device is capable of supporting the radio access bearer based at least partially upon the statistic measured by the mobile device and a comparison of the statistic to a thresholding algorithm. In some embodiments, the statistic is one or more of an uplink transmit power statistic, a downlink received power, and a number of power-up commands received from a base station. The thresholding algorithm may employ a threshold value to which the statistic measured by the mobile device is compared. The threshold value may be a static threshold value or an adjustable threshold value. In some embodiments, the adjustable threshold value is determined based upon a learning model by which the mobile device adjusts the threshold value depending upon radio conditions experienced by the mobile device. Alternatively, the thresholding algorithm may employ a weighting function that utilizes a plurality of statistics, each of which is weighted by a certain factor to calculate a weighted result that is used to determine if the mobile device is capable of supporting the radio access bearer.

In some embodiments, determining if the mobile device is capable of supporting the radio access bearer includes evaluating a risk of dropping the voice session if the radio access bearer is established given a current radio condition being experienced by the mobile device and an importance of data prompting establishment of the data session via the request. In these embodiments, establishment of the radio access bearer is allowed or denied based upon a determination of if the risk of dropping the voice session is tolerable. In some embodiments, determining that the risk of dropping the voice session is tolerable or intolerable is based upon priority data provided in a priority data file stored on the mobile device. In some embodiments, the priority data file is received by the mobile device from a mobile network operator serving the mobile device.

According to another aspect disclosed herein, a method for selectively establishing radio access bearers includes collecting an uplink transmit power statistic for a mobile device during a voice session occurring over a first radio access bearer established between the mobile device and a mobile telecommunications network, receiving a request to initiate a data session between the mobile device and the mobile telecommunications network, and, in response to receiving the request, calculating an available uplink transmit power from the uplink transmit power statistic. The method further includes determining if a second radio access bearer configured to simultaneously support the voice session and the data session is to be established based at least partially upon the available uplink transmit power of the mobile device.

In some embodiments, determining if the second radio access bearer is to be established includes determining if the available uplink transmit power is within a certain percentage of a maximum uplink transmit power of the mobile device. In some embodiments, determining if the second radio access bearer is to be established includes determining if the available uplink transmit power is within a number of decibels of a maximum uplink transmit power of the mobile device. In some embodiments, determining if the second radio access bearer is to be established includes determining a probability of the voice session being terminated should the second radio access bearer be established. In some embodiments, determining if the second radio access bearer is to be established includes evaluating a risk associated with establishing the second radio access bearer.

According to another aspect disclosed herein, a computer storage medium has computer readable instructions stored thereupon that, when executed by a mobile device, cause the mobile device at least to collect uplink transmit power statistics for the mobile device, calculate a mean uplink transmit power from the uplink transmit power statistics, calculate a standard deviation from the uplink transmit power statistics, calculate a value for the mean uplink transmit power plus the standard deviation, determine if the value calculated for the mean uplink transmit power plus the standard deviation at least meets a threshold value, and allow or deny establishment of a radio access bearer based upon whether the value at least meets a threshold value.

In some embodiments, the mean uplink transmit power is calculated in response to receiving a request to establish a data session. In some embodiments, the threshold value is one of a static threshold value and an adjustable threshold value. In some embodiments, the adjustable threshold value is adjustable based upon a radio condition experienced by the mobile device.

Other systems, methods, and/or computer readable media according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for selectively establishing RABs configured to support simultaneous voice and data communications in a mobile telecommunications network. While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
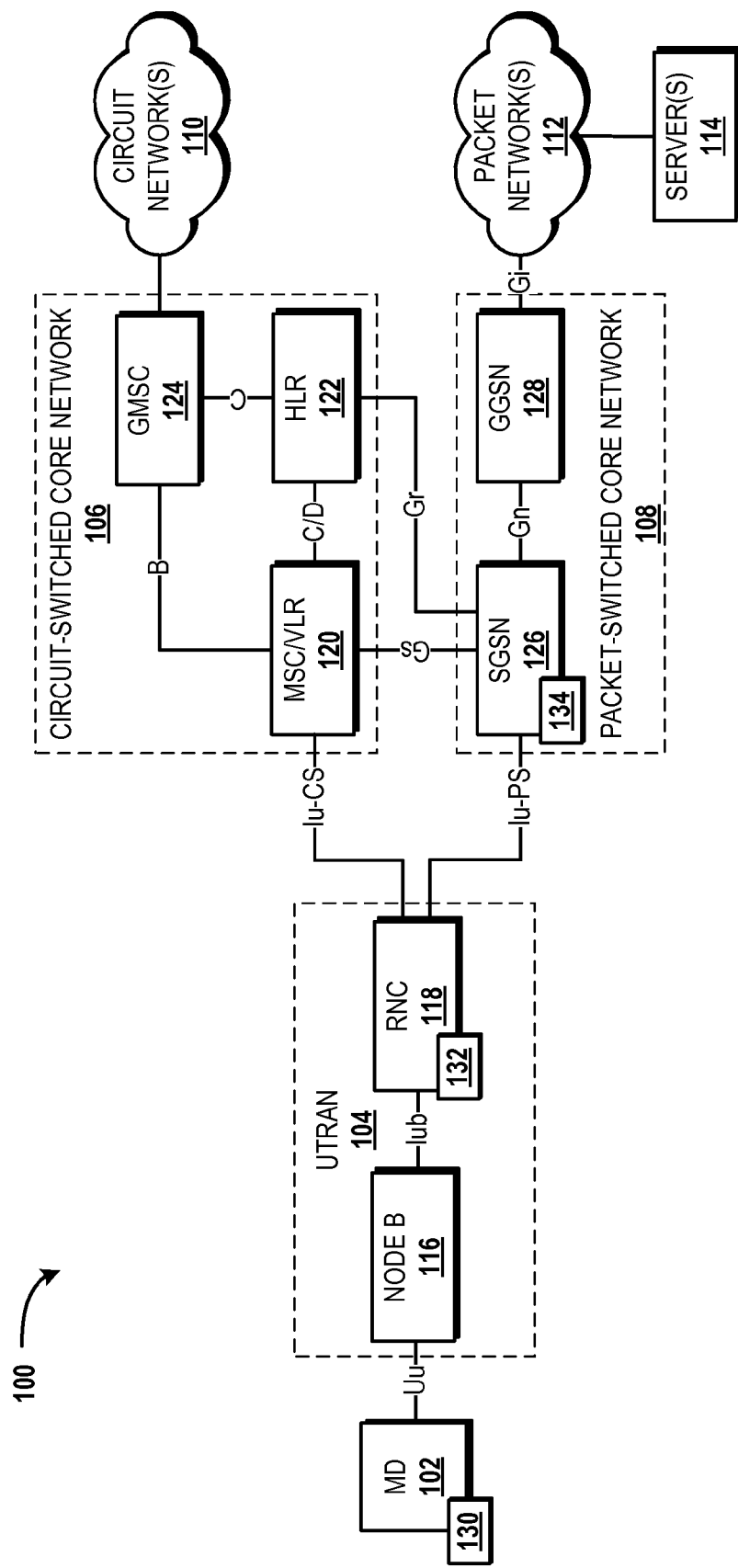
FIG. 1 is a network architecture diagram schematically illustrating an exemplary operating environment for implementing various embodiments presented herein.

Referring now to FIG. 1, aspects of a network 100 for various embodiments presented herein will be described. The network 100 is illustrated and described in context of a Universal Mobile Telecommunications System/Universal Mobile Telephone System ("UMTS") network capable of providing simultaneous voice and data communications. Although various aspects are disclosed in this particular context, those skilled in the art will appreciate the applicability of many of the disclosed aspects to other mobile telecommunications technologies that support simultaneous voice and data communications, and/or technologies such as High-Speed Packet Access ("HSPA") and HSPA+ that enhance or build upon the capabilities of UMTS by providing higher data transfer rates or other features. It is contemplated that the network 100 may not include all of the network elements shown in FIG. 1, may include other network elements that are not explicitly shown in FIG. 1, may include multiples of the network elements that are explicitly shown in FIG. 1, and/or may utilize an architecture completely different than that shown in FIG. 1.

The network 100 includes a mobile communications device ("MD") 102, such as a cellular telephone or a computer configured with an integrated or an external, removable UMTS access component that facilitates wireless communication with the network 100. In some embodiments, the UMTS access component is a cellular telephone that is in wired or wireless communication with the computer to facilitate a tethered data connection to the network 100. In other embodiments, the UMTS access component includes a wireless transceiver to send and receive data from the network 100 and a universal serial bus ("USB") or another communication interface for connection to the computer to enable tethering. In any case, the MD 102 is configured to wirelessly communicate with a UMTS Terrestrial Radio Access Network ("UTRAN") 104 via a Uu radio interface, as shown in the illustrated embodiment. An exemplary device architecture of the MD 102 is illustrated and described herein below with reference to FIG. 11.

The UTRAN 104 is in communication with a circuit-switched core network ("CS CN") 106 and a packet-switched core network ("PS CN") 108 via an Iu-CS interface and an Iu-PS interface, respectively. The CS CN 106 is also in communication with a circuit network 110, such as a Public Switched Telephone Network ("PSTN"), an Integrated Services Digital Network (ISDN), or other circuit-switched network. The PS CN 108 is also in communication with a packet network 112, such as an internet, an intranet, or other packet-switched network.

The packet network 112 is also in communication with a server 114. The server 114 is configured to provide data content to the PS CN 108 for delivery to the MD 102 over the UTRAN 104. The content provided by the server 114 may be content requested and subsequently downloaded by the MD 102 (e.g., a data pull operation) or may be content pushed to the MD 102. The server 114 may host content associated with a particular website and/or a particular service. Exemplary services that may be provided by the server 114 include an email service, a social networking service, a professional networking service, a news service, an online gaming service, an audio or video streaming service, an application software download service, a music or video download service, a web application service, or any other type of service that provides content to mobile devices.

Referring again to the UTRAN 104, as illustrated, the UTRAN 104 includes a node B 116 and a radio network controller ("RNC") 118. The node B 116 includes one or more transceivers for transmission and reception of data across the Uu radio interface. The node B 116 is the terminating node of the UTRAN 104 for the Uu radio interface. The node B 116 is in communication with the RNC 118 via an Iub interface. The RNC 118 is configured to allocate radio resources to the MD 102, apply codes to describe channels in accordance with Wideband Code Division Multiple Access ("W-CDMA") protocol, and control handovers between the node B 116 and one or more other node Bs (not shown). The RNC 118 also acts a concentrator, so that many different low capacity connections to the node B 116 become reduced to a smaller number of connections towards the CS CN 106 and the PS CN 108 via the Iu-CS and Iu-PS interfaces, respectively.

The UTRAN 104 and, particularly, the RNC 118 communicates with the CS CN 106 via a mobile switching center ("MSC") 120 using the Iu-CS interface. The MSC 120 is configured to function as a telecommunications switch for voice calls in the network 100. The MSC 120 is in communication with location databases, such as a visiting location register ("VLR") and a home location register ("HLR") 122. The VLR may be logically associated with the MSC 120, as illustrated, or may be provided as a separate network element in communication with the MSC 120. The VLR is a database configured, in part, to store all subscriber data that is required for call processing and mobility management for mobile subscribers that are currently located in an area controlled by the MSC 120. The HLR 122 is in communication with the MSC 120 and the VLR via a C interface and a D interface, respectively (shown together for convenience as a C/D interface). The HLR 122 is a database configured, in part, to provide routing information for mobile-terminated calls and various messaging communications. The HLR 122 is also configured to maintain subscriber data that is distributed to the relevant VLR or elements of the PS CN 108 through an attach process and to perform mobility management procedures, such as location area and routing area updates.

The HLR 122 may be logically associated with an authentication center (not shown) that is configured to authenticate a universal subscriber identity module ("USIM", also not shown) of the MD 102 when the MD 102 attempts to connect to the network 100, such as during a power-on procedure. Once authenticated, the HLR 122 is permitted to manage the USIM and services provided to the MD 102. The authentication center is also configured to generate an encryption key that is used to encrypt all wireless communications between the MD 102 and the core networks 106, 108.

The MSC 120 is also in communication with a gateway MSC ("GMSC") 124 via a B interface. The HLR 122 is in communication with the GMSC 124 via a C interface to obtain routing information for mobile-terminated calls originating from fixed network devices, such as landline telephones operating via the circuit network 110. The GMSC 124 is configured, in part, to provide an edge function within the CS CN 106 to the circuit network 110. In particular, the GMSC 124 is configured to terminate signaling and traffic from the circuit network 110 and convert the signaling and traffic to protocols employed by the CS CN 106. The GMSC 124 may also provide gateway functions of the network 100 to another public land mobile network ("PLMN", not shown).

The CS CN 106 is in communication with the PS CN 108 via the MSC 120 and the HLR 122. In particular, the MSC 120 and the HLR 122 are in communication with a serving General Packet Radio Service ("GPRS") support node ("SGSN") 126 via a Gs interface and a Gr interface, respectively. The SGSN 126 records and tracks the location of the MD 102 in the network 100 and provides security and access control functions for packet-switched data connections within the network 100. The SGSN 126 is in communication with the RNC 118 via the Iu-PS interface and a gateway GPRS support node ("GGSN") 128 via a Gn interface. The SGSN 126 may also provide gateway functions of the PS CN 108 to another PLMN (not shown) via a Gp interface (also not shown).

The GGSN 128 is configured, in part, to provide an edge routing function to the packet network 112 via a Gi interface. The GGSN 128 is configured to receive data from the packet network 112 and provide it to the SGSN 126 for delivery to the MD 102 over the UTRAN 104. The GGSN 128 also provides firewall and filtering functionality for the PS-CN 108.

The CS CN 106, the UTRAN 104, and the MD 102 are configured to jointly negotiate the establishment of a voice-only RAB ("vRAB"), for example, to facilitate voice communications between the MD 102 and another device. In some embodiments, a vRAB is established in response to a mobile-initiated or a mobile-terminated call directed to or received from another device (not shown) operating within the network 100, another PLMN, or the circuit network 110. In any case, a vRAB may be established according to known vRAB establishment procedures, after which voice communications between the MD 102 and the other device can be exchanged, at least in part, over the vRAB. It is also contemplated that the vRAB may be configured to facilitate a conference call, wherein the MD 102 is one of three or more devices participating in the conference call.

The PS CN 108, the UTRAN 104, and the MD 102 are configured to jointly negotiate the establishment of a data-only RAB ("dRAB"), for example, to facilitate data communications between the MD 102 and the server 114. The dRAB may be established according to known dRAB establishment procedures in response to a pull or push operation initiated by the MD 102 or the server 114. Data communications between the MD 102 and the server 114 can then be exchanged, at least partially, over the dRAB. The initiation of a push or pull operation by the MD 102 or the server 114 is referred to herein, at times, as a data request. Generally, though, a data request is any message sent by an entity of the network 100 to another entity of the network 100 in an attempt to access or deliver data content.

The CS CN 106, the PS CN 108, the UTRAN 104, and the MD 102 are also configured to jointly negotiate the establishment of a multi-RAB ("mRAB"), for example, to facilitate voice communications between the MD 102 and another device, and to facilitate data communications between the MD 102 and the server 114. In some embodiments, an mRAB is established during a voice session occurring over a vRAB. In these embodiments, after the mRAB is established, the voice session is transferred to the mRAB and the vRAB is torn down. A data session can then be simultaneously conducted with the voice session over the mRAB. After the data session ends, a new vRAB may be established and the voice session may be transferred to the new vRAB. Alternatively, the voice session remains on the mRAB until completion.

In other embodiments, an mRAB is established during a data session occurring over a dRAB. In these embodiments, after the mRAB is established, the data session is transferred to the mRAB and the dRAB is torn down. A voice session can then be simultaneously conducted with the data session over the mRAB. After the data session ends, a new dRAB may be established and the data session may be transferred to the new dRAB. Alternatively, the data session remains on the mRAB until completion.

Data requests originating from the MD 102 may be device-initiated or user-initiated. In some embodiments, a device-initiated data request is a data request generated automatically by the MD 102 in response to instructions received from an application residing on the MD 102. In some embodiments, the MD 102 receives no direct user input through the application or otherwise to prompt generation of the data request. In other embodiments, the MD 102 receives indirect user input, such as via preference settings or other set and forget type settings, from a user of the MD 102. These settings may include, but are not limited to, the frequency by which an application requests a data connection to download content. A user may desire to establish such a setting to mitigate data usage by the application, thereby potentially reducing data usage costs. The frequency by which the application requests a data connection to download content may alternatively be set by the application developer, the mobile network operator providing the network 100, another mobile network operator, another party, or another entity.

In some embodiments, a user-initiated data request is a data request generated by the MD 102 in response to a direct user input. In some embodiments, a direct user input is a user input that causes an application to request a data connection. For example, a user may launch an application that at least temporarily requires a data connection. In this example, the application may require the data connection to search for available updates, download updates, download content for user consumption, or otherwise use the data connection to provide some functionality to the user without the user providing an input in excess of launching the application. As an additional example, a user may launch an application that only requires a data connection for a particular feature or mode within the application, such as a game application that does not require a data connection for some features (e.g., single player modes, menu navigation, etc.) but requires a data connection for other features (e.g., multiplayer modes, to download optional updates, to download optional additional content, etc.). Other examples of user inputs that would prompt an application to request a data connection include, but are not limited to, a search query within an application (e.g., a web browser, an email client, an application store, a music or video store, etc.), a user-initiated data pull that prompts the application to initiate a download operation, a web page refresh, an email refresh, an audio or video streaming request, a multimedia messaging service ("MMS") operation, and the like.

In some embodiments, data requests originating from the network 100 include an action taken by an entity external to the MD 102 to invoke an operation on the MD 102 that at least temporarily requires a data connection. For example, data requests originating from the network 100 may originate from the GGSN 128 in response to the GGSN 128 receiving instructions from the server 114 to deliver content to the MD 102 in accordance with a data push operation. The server 114 may be configured to push any type of content to the MD 102.

Regardless of the origin of the data request (i.e., the MD 102 or an entity external to the MD 102 within the network 100), in some embodiments, the data request includes a packet data protocol ("PDP") message used during a PDP activation procedure between the MD 102 and the PS CN 108 as a step towards creation of a dRAB or an mRAB depending upon the scenario. In particular, the data request, in some embodiments, includes a PDP context activation request (i.e., an Activate PDP Context message). For network-initiated data requests, a PDP context activation request is generated by and sent from the GGSN 128 to the SGSN 126 as an initial operation towards the creation of a PDP context between the MD 102 and the SGSN 126. For device-initiated or user-initiated data requests, a PDP context activation request is generated by and sent from the MD 102 to the SGSN 126 towards the creation of a PDP context between the MD 102 and the SGSN 126. For either scenario, after a PDP context is established between the MD 102 and the SGSN 126, a RAB (e.g., a dRAB or an mRAB) is established according to RAB establishment procedures. Each PDP context has its own RAB (between the MD 102 and the SGSN 126) and tunnel (between the SGSN 126 and the GGSN 128). Other details regarding the establishment of a PDP context and a RAB are known to those skilled in the art and are beyond the scope of this disclosure. Particularly, the messaging that occurs between elements of the network 100 during a PDP context activation sequence and a RAB establishment procedure.

In the illustrated embodiment of FIG. 1, the MD 102, the RNC 118, and the SGSN 126 each have an application program module associated therewith. In particular, the MD 102 is associated with an MD application 130 (also referred to herein as "the mRAB decision application 130"), the RNC is associated with an RNC application 132, and the SGSN 126 is associated with an SGSN application 134. In some embodiments, the mRAB decision application 130 of the MD 102 is configured to perform operations towards a determination of whether an mRAB should be established, as described in greater detail herein, for example, with reference to FIGS. 2-6. In some embodiments, the RNC application 132 is configured to hold a data request received from the SGSN 126, prompt the SGSN 126 to buffer data associated with the data request, and retry transmission of the data request to the MD 102 based upon a retry interval, as described in greater detail herein, for example, with particular reference to FIG. 8. In some embodiments, the SGSN module 134 is configured to delegate a retry interval by which the SGSN 126 should retry attempts to send data received from the GGSN 128 to the MD 102 over the UTRAN 104, as described in greater detail below, for example, with reference to FIG. 7.

Figure 2:
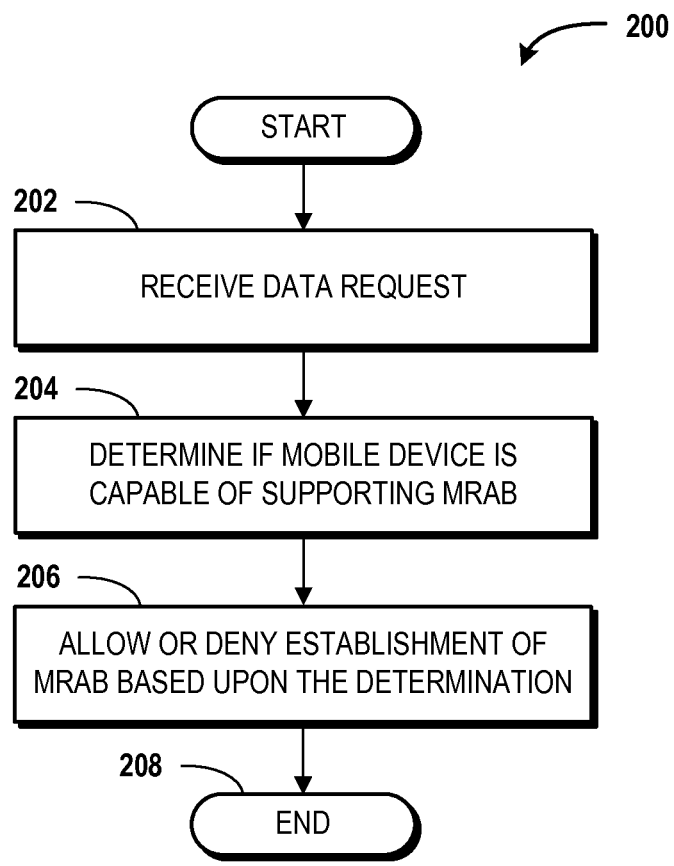
FIG. 2 is a flow diagram showing aspects of a method for selectively establishing an mRAB, according to an exemplary embodiment.

Turning now to FIG. 2, aspects of a method 200 for selectively establishing an mRAB will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, one or more of the network elements described above with reference to FIG. 1, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the MD 102, the RNC 116, and/or the SGSN 122, for example, by execution, respectively, of computer-executable instructions contained in the mRAB decision application 130, the RNC application 132, and/or the SGSN application 134. It should be understood that these embodiments are exemplary, and should not be viewed as being limiting in any way. The method 200 is now described with reference to FIG. 2.

The method 200 begins at operation 202, wherein the MD 102 receives a data request. The data request may be a device-initiated, user-initiated, or network-initiated data request, as described in greater detail above with reference to FIG. 1. For a device-initiated or user-initiated data request, the receipt of the data request is internal to the MD 102. That is, for example, the MD 102 may receive a data request from an application executing on the MD 102. For a network-initiated data request, the receipt of the data request is by a transceiver (shown in FIG. 12) of the MD 102.

From operation 202, the method 200 proceeds to operation 204, wherein it is determined if the MD 102 is capable of supporting an mRAB. The mRAB decision application 130 (shown in FIG. 1) may be executed by the MD 102 to make this determination.

In some embodiments, the determination made in operation 204 is based upon whether the MD 102 is currently engaged in a voice communication. If the MD 102 is currently engaged in a voice communication, the MD 102 may determine that it is not capable of supporting an mRAB. Otherwise, if the MD 102 is not currently engaged in a voice communication, the MD 102 may determine that the MD 102 is capable of supporting an mRAB. Although not shown in the illustrated embodiment, instead of a data request, the MD 102 may receive an incoming call. In this case, the determination made in operation 204 is based upon whether the MD 102 is currently engaged in a data communication.

In other embodiments, the determination made in operation 204 is based at least partially upon one or more statistics measured by the MD 102 and a comparison of the measured statistics to a thresholding algorithm. The one or more statistics measured by the MD 102 may include, but are not limited to, an uplink transmit ("Tx") power (i.e., from the MD 102 to the node B 116), a downlink received ("Rx") power (i.e., from the node B 116 to the MD 102), and/or a number of power-up commands received by the MD 102 from the node B 116. In some embodiments, these statistics are measured by a standalone measuring application that is in communication with the mRAB decision application 130. In these embodiments, the measuring application provides the measured statistics to the mRAB decision application 130 so that the mRAB decision application 130 can make the determination of operation 204. In some embodiments, the measuring application is a diagnostics application configured to perform diagnostic operations in addition to measuring statistics. In other embodiments, the statistics are measured directly by the mRAB decision application 130. In any case, the statistics are compared to a thresholding algorithm to determine if the MD 102 is capable of supporting an mRAB.

The thresholding algorithm, in some embodiments, employs a threshold value that, when reached or exceeded, causes the mRAB decision application 130 to determine that the MD 102 is incapable of supporting an mRAB. For example, a threshold may be set to 75% of a maximum uplink Tx power of the MD 102. When the measured uplink Tx power (e.g., instantaneous or mean over a particular time period) of the MD 102 reaches or exceeds a certain percentage (e.g., 75%) of the maximum uplink Tx power, the mRAB decision application 130 determines that it is incapable of supporting an mRAB. The thresholding algorithm may alternatively consider an available uplink Tx power of the MD 102 which, in the above example, would be 25%. Thresholds may also be set in terms of decibels.

It is contemplated that the thresholding algorithm may employ a learning model by which the MD 102 adjusts the threshold value depending upon various radio conditions that require more or less power. For example, the MD 102 may require less uplink Tx power to support an mRAB when the MD 102 is located in a rural or suburban environment than when the MD 102 is located in an urban environment due to the prevalence of buildings, traffic, and other obstacles that imped the propagation of radio signals in urban environments. The learning model may adjust the threshold value to require a lower percentage of the maximum uplink Tx power when in certain environments. For example, the MD 102 may, on average during a voice session, be using X percent of a total transmit power Y to maintain the voice session. X may fluctuate higher or lower due to various factors such as location type (e.g., urban, suburban, or rural; indoor or outdoor), usage scenario (e.g., time of day, day of week, etc.), handset orientation, user mobility, network loading, human-made noise, distance from base station (e.g., the node B 112), signal fading and other signal propagation effects, and the like. Accordingly, the threshold value may be adjusted to compensate for such factors. The thresholding algorithm may alternatively be viewed in terms of decibels ("dB") or dBm instead of percentages.

It is also contemplated that the thresholding algorithm may employ a weighting function that utilizes multiple statistics (e.g., uplink Tx power and downlink Rx power), each weighted by a certain factor to calculate a weighted result that is used by the thresholding algorithm to determine whether the MD 102 is capable of supporting an mRAB. Other variations of a thresholding algorithm are described herein below with reference to the other FIGURES.

It should be understood that while the MD 102 may, at times, be capable of supporting an mRAB, doing so would increase the probability of an mRAB failure, potentially resulting in a tear down of the mRAB and a dropped call. Accordingly, determining if the MD 102 is capable of supporting an mRAB, in some embodiments, is an evaluation of a risk merit. That is, an evaluation of the risk of a dropped call if an mRAB is to be established given the current radio conditions being experienced by the MD 102 and the importance of the data prompting the establishment of the mRAB. In some instances, the risk of a dropped call is tolerable for data that is deemed important to the user, the network 100, the mobile network operator providing the network 100, another mobile network operator, another party, or another entity. For example, from a user perspective, navigation data may be considered important and worth the risk of potentially dropping a voice call. By contrasting example, an email push may be less crucial than navigation data and, as such, not worth the risk of potentially dropping a voice call.

In consideration of the determination of operation 204 as a risk merit evaluation, it is contemplated that the MD 102 can store priority data for various data types and/or various applications. For example, the MD 102 may include priority data that instructs the MD 102 to establish an mRAB for certain data types and/or applications based upon their priority level even if the determination of operation 204, under normal conditions, yields a result that the MD 102 is incapable of supporting an mRAB. The priority data may be globally set for a data type such that any application that uses the data type is permitted to access a data connection in accordance with a priority level established for the data type. Alternatively, the priority data may be set on a per application basis such that the priority level of the application controls. The priority data may be established by a user, a mobile network operator, a third party, or an entity. In some embodiments, the mobile network operator generates and sends a priority data file to the MD 102, so that the mobile network operator can control what data types and/or applications are permitted to request a data connection under certain radio conditions (e.g., under certain threshold values).

From operation 204, the method 200 proceeds to operation 206, wherein the MD 102 allows or denies establishment of an mRAB based upon the determination made in operation 204. In some embodiments, the MD 102 notifies the user that a data connection is unavailable if establishment of an mRAB is denied, as will be described in greater detail below with reference to FIG. 9. In other embodiments, the user is given the option to override the decision made by the MD 102 to deny establishment of an mRAB, as will be described in greater detail below with reference to FIG. 10. From operation 206, the method 200 proceeds to operation 208. The method 200 ends at operation 208.

Figure 3:
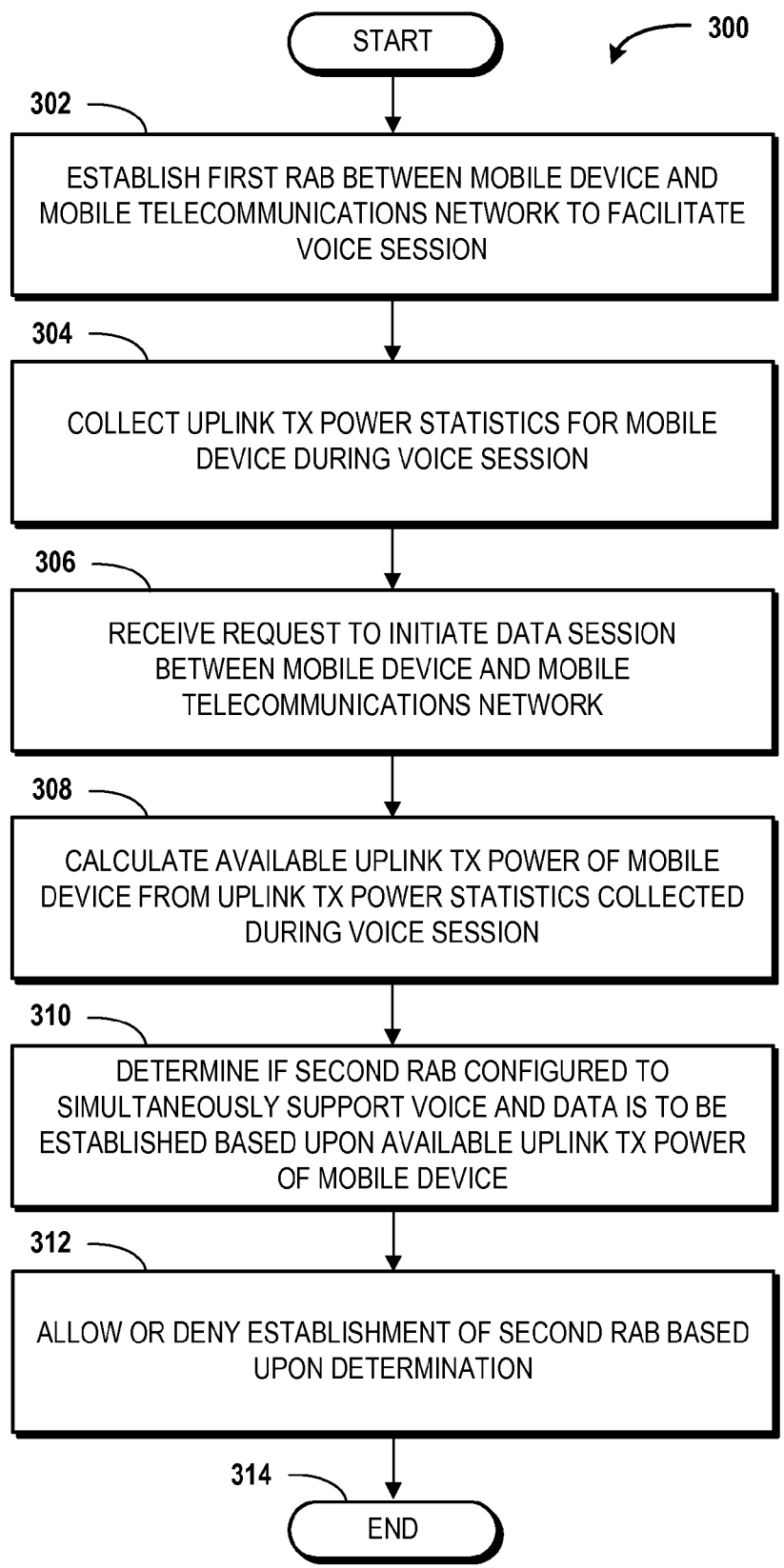
FIG. 3 is a flow diagram showing aspects of another method for selectively establishing an mRAB, according to an exemplary embodiment.

Turning now to FIG. 3, aspects of a method 300 for selectively establishing an mRAB based at least partially on an available uplink Tx power of the MD 102 will be described in detail. The method 300 begins at operation 302, wherein a first RAB (e.g., a vRAB) is established between the MD 102 and the network 100 to facilitate a voice session. The first RAB may be established in response to a mobile-initiated or a mobile-terminated call directed to or received from another device operating within the network 100, another PLMN, the circuit network 110, or the packet network 112. In any case, the first RAB is established and the voice session between the MD 102 and the other device is carried out. It is also contemplated that the first RAB may be configured to facilitate a conference call, wherein the MD 102 is one of three or more devices participating in the voice session.

From operation 302, the method 300 proceeds to operation 304, wherein uplink Tx power statistics for the MD 102 are collected during the voice session. In some embodiments, establishment of the voice session prompts the mRAB decision application 130 to begin, or instruct another application resident on the MD 102 (e.g., a measuring application) to begin measuring the uplink Tx power of the MD 102. The Tx power statistics may be collected at any periodicity or intermittently, and for any duration up to and including the entirety of the voice session.

From operation 304, the method 300 proceeds to operation 306, wherein the MD 102 receives a request to initiate a data session between the MD 102 and the network 100. The request received by the MD 102 may be a user-initiated request, a device-initiated request, or a network-initiated request in accordance with any of the embodiments described above.

From operation 306, the method 300 proceeds to operation 308, wherein the mRAB decision application 130 calculates an available Tx power of the MD 102 from the Tx power statistics collected during the operation 304. From operation 308, the method 300 proceeds to operation 310, wherein the mRAB decision application 130 determines if a second RAB (e.g., an mRAB) configured to simultaneously support voice and data is to be established based upon the available Tx power of the MD 102 calculated in operation 308. From operation 310, the method 300 proceeds to operation 312, wherein the mRAB decision application 130 allows or denies establishment of the second RAB based upon the determination. From operation 312, the method 300 proceeds to operation 314. The method 300 ends at operation 314.

Figure 4:
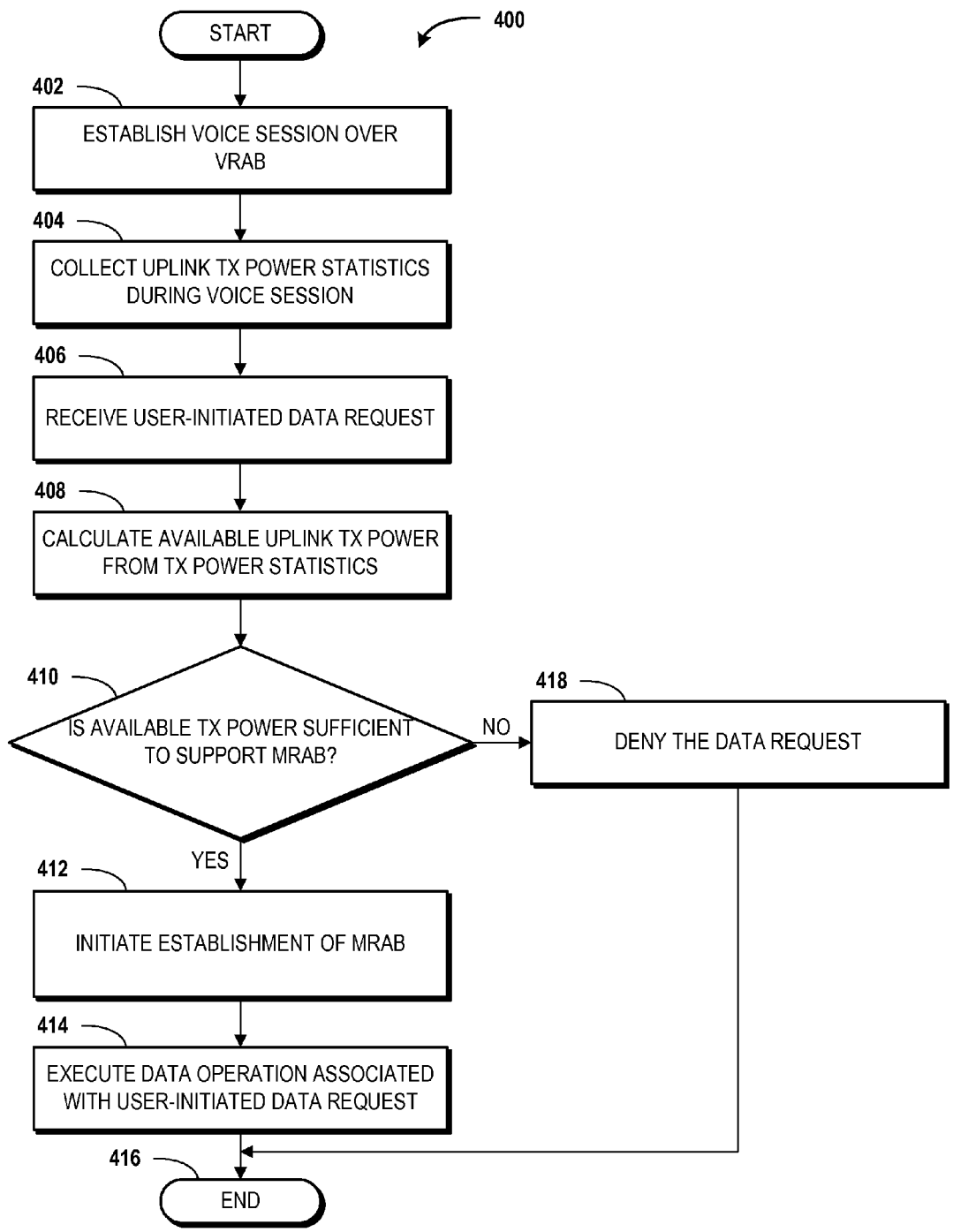
FIG. 4 is a flow diagram showing aspects of a method for selectively establishing an mRAB in response to a user-initiated data request, according to an exemplary embodiment.

Turning now to FIG. 4, aspects of a method 400 for selectively establishing an mRAB in response to a user-initiated data request will be described in detail. The method 400 begins and proceeds to operation 402, wherein the MD 102 establishes a voice session over a vRAB with the network 100. From operation 402, the method 400 proceeds to operation 404, wherein the mRAB decision application 130 collects uplink Tx power statistics during the voice session. From operation 404, the method proceeds to operation 406, wherein the MD 102 receives a user-initiated data request, such as a user-initiated data request described above with reference to FIG. 1. Alternatively, at operation 406, the MD 102 may receive a device-initiated data request. From operation 406, the method 400 proceeds to operation 408, wherein the mRAB decision application 130 calculates an available Tx power from the Tx power statistics collected during the operation 404.

From operation 408, the method 400 proceeds to operation 410, wherein the mRAB decision application 130 determines if the available Tx power calculated in operation 408 is sufficient to support an mRAB. This determination may be based upon a thresholding algorithm, such as described above with reference to FIG. 2. If it is determined at operation 410 that the available Tx power is sufficient to support an mRAB, the method 400 proceeds to operation 412, wherein the MD 102 initiates the establishment of an mRAB, for example, by generating a PDP context activation request and sending the PDP context activation request to the SGSN 126. The MD 102 and the SGSN 126 carry out the remainder of a PDP context activation procedure and an mRAB establishment procedure. After an mRAB is established, the voice session can be transferred to the mRAB and the vRAB can be torn down.

From operation 412, the method 400 proceeds to operation 414, wherein the MD 102 executes a data operation associated with the user-initiated data request. For example, the MD 102 may initiate a data download, request a refresh of data content, initiate a search query, or otherwise utilize the data connection afforded by the mRAB. From operation 414, the method proceeds to operation 416. The method 400 ends at operation 416.

If it is determined at operation 410 that the available Tx power is insufficient to support an mRAB, the method 400 proceeds to operation 418, wherein the mRAB decision application 130 denies the data request. Denial of the data request may be accompanied by a notification to the user, as described in greater detail below with reference to FIG. 9. Alternatively, denial of the data request may be accompanied by an override option that is presented to the user, as described in greater detail below with reference to FIG. 10. From operation 418, the method 400 proceeds to operation 416. The method 400 ends at operation 416.

Figure 5:
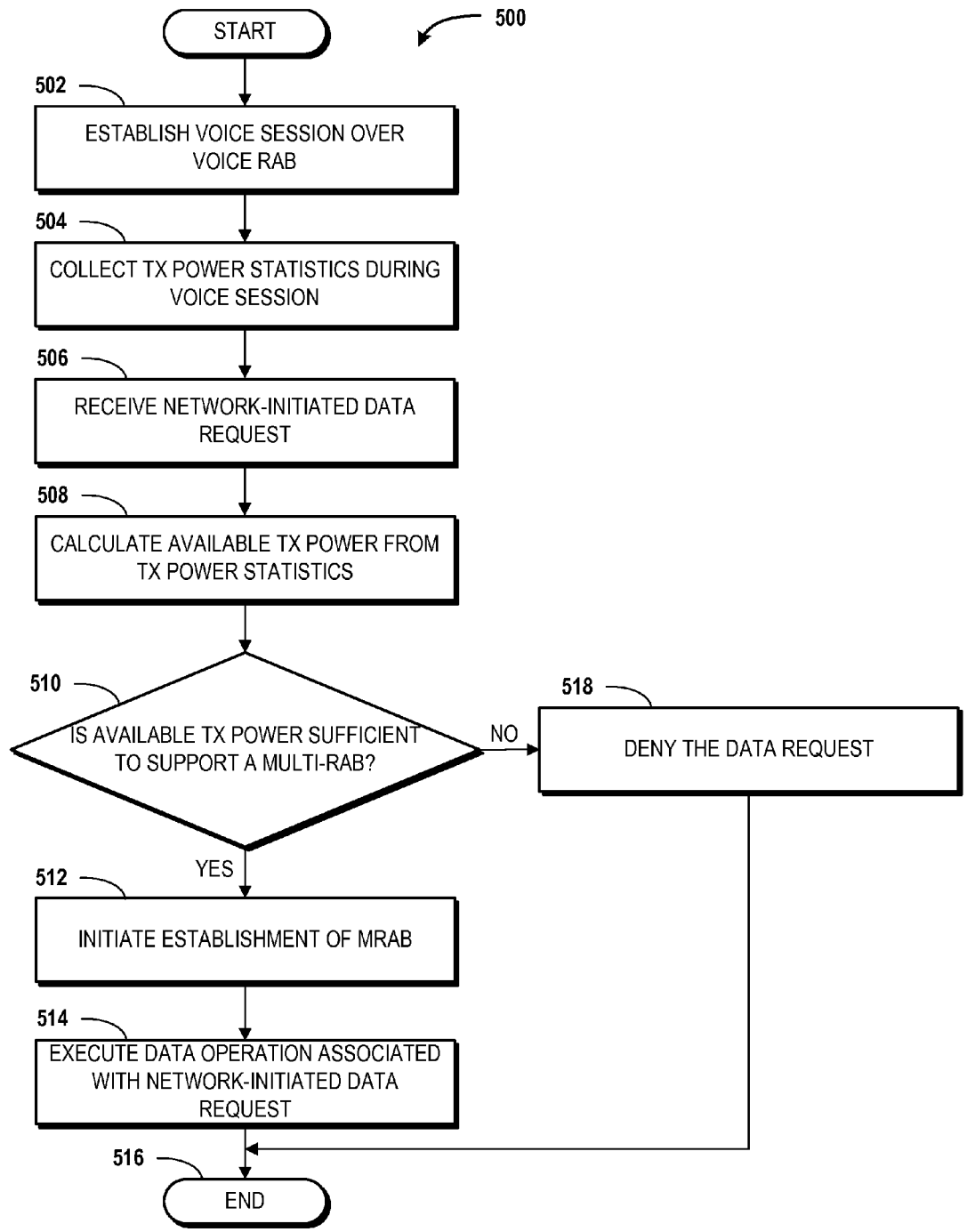
FIG. 5 is a flow diagram showing aspect of a method for selectively establishing an mRAB in response to a network-initiated data request, according to an exemplary embodiment.

Turning now to FIG. 5, aspects of a method 500 for selectively establishing an mRAB in response to a network-initiated data request will be described in detail. The method 500 begins and proceeds to operation 502, wherein the MD 102 establishes a voice session over a vRAB with the network 100. From operation 502, the method 500 proceeds to operation 504, wherein the mRAB decision application 130 collects uplink Tx power statistics during the voice session. From operation 504, the method proceeds to operation 506, wherein the MD 102 receives a network-initiated data request, such as a network-initiated data request described above with reference to FIG. 1. From operation 506, the method 500 proceeds to operation 508, wherein the mRAB decision application 130 calculates an available Tx power from the Tx power statistics collected during operation 504.

From operation 508, the method 500 proceeds to operation 510, wherein the mRAB decision application 130 determines if the available Tx power calculated in operation 508 is sufficient to support an mRAB. This determination may be based upon a thresholding algorithm, such as described above with reference to FIG. 2. If it is determined at operation 510 that the available Tx power is sufficient to support an mRAB, the method 500 proceeds to operation 512, wherein the network 100 initiates the establishment of an mRAB, for example, by generating (e.g., by the SGSN 126) a PDP context activation request and sending the PDP context activation request to the MD 102. The MD 102 and the SGSN 126 carry out the remainder of a PDP context activation procedure and an mRAB establishment procedure. After an mRAB is established, the voice session can be transferred to the mRAB and the vRAB can be torn down. From operation 512, the method 500 proceeds to operation 514, wherein the MD 102 executes a data operation associated with the network-initiated data request. From operation 514, the method proceeds to operation 516. The method 500 ends at operation 516.

If it is determined at operation 510 that the available Tx power is insufficient to support an mRAB, the method 500 proceeds to operation 518, wherein the mRAB decision application 130 denies the data request. In some embodiments, the MD 102, in response to the mRAB decision application 130 denying the data request, ignores the network-initiated data request, permitting the data request to be retried and, if the MD 102 again determines the available Tx power is insufficient, further ignore the retry attempt(s) and eventually time out. In these embodiments, the SGSN 122 may attempt to retransmit the data request to the MD 102. These attempts may also be ignored, or, after a certain number of retries, the MD 102 may respond with a notification that the MD 102 is unable to act on the data request. Denial of the data request may be accompanied by a notification to the user, as described in greater detail below with reference to FIG. 9. Alternatively, denial of the data request may be accompanied by an override option that is presented to the user, as described in greater detail below with reference to FIG. 10. From operation 518, the method 500 proceeds to operation 516. The method 500 ends at operation 516.

Figure 6:
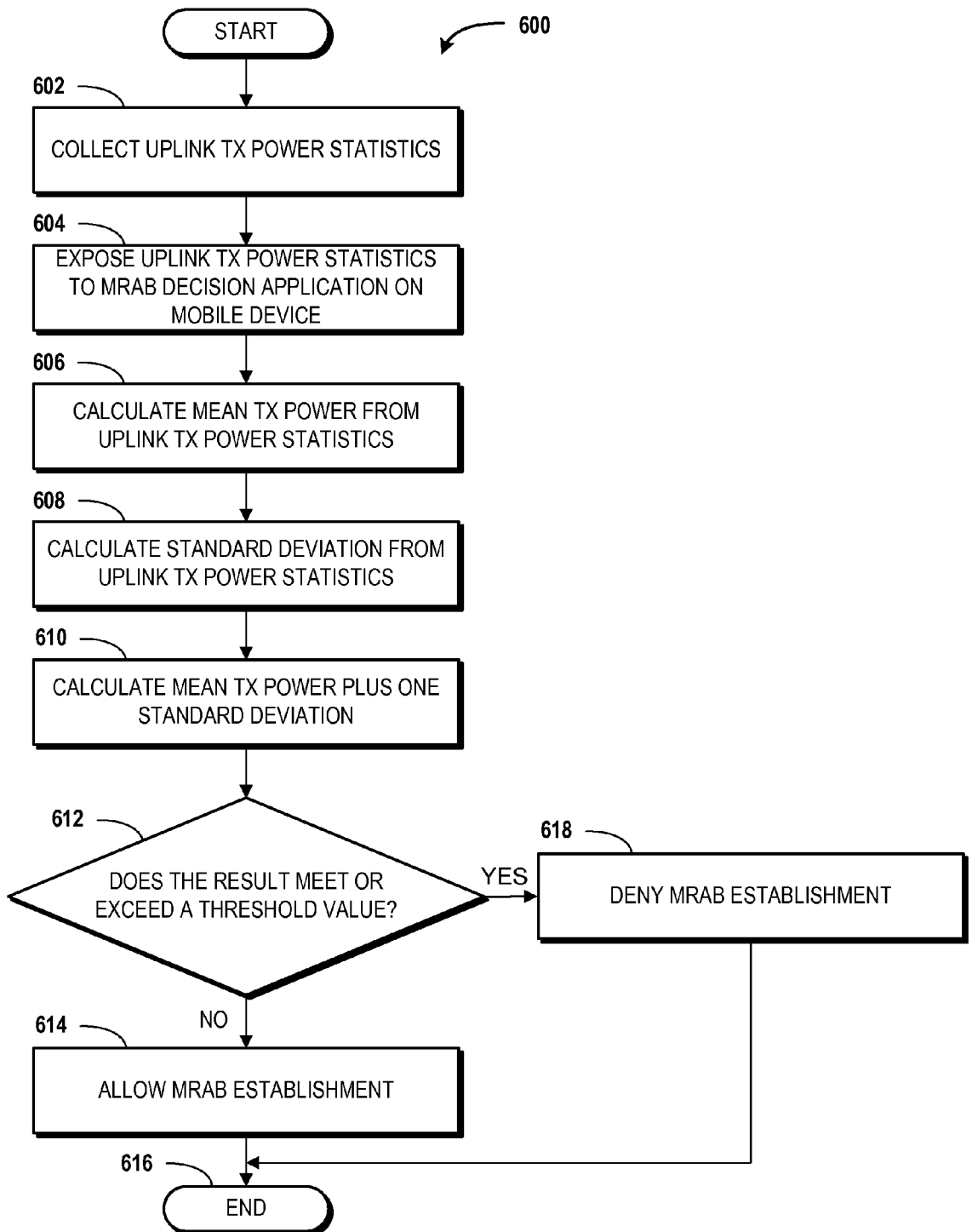
FIG. 6 is a flow diagram showing aspects of another method for selectively establishing an mRAB, according to an exemplary embodiment.

Turning now to FIG. 6, aspects of another method 600 for selectively establishing an mRAB will be described in detail. The method 600 begins and proceeds to operation 602, wherein the MD 102 collects uplink Tx power statistics, according to the methods described above. From operation 602, the method 600 proceeds to operation 604, wherein the MD 102 exposes the uplink Tx power statistics collected in operation 602 to the mRAB decision application 130. The Tx power statistics may be collected at any periodicity or intermittently, and for any duration. In some embodiments, the mRAB decision application 130 collects the uplink Tx power statistics and, as such, operation 604 is omitted. Otherwise, if another application (e.g., a measuring application) collects the uplink Tx power statistics, that application exposes the uplink Tx power statistics to the mRAB decision application 130 at operation 604.

From operation 604, the method proceeds to operation 606, wherein the mRAB decision application 130 calculates a mean (i.e., an average) Tx power from the uplink Tx power statistics. The mean Tx power may be calculated using any number of instantaneous uplink Tx power samples collected during operation 602. Moreover, the mean Tx power may be calculated using at least portion of the uplink Tx power samples collected during operation 602.

From operation 606, the method 600 proceeds to operation 608, wherein the mRAB decision application 130 calculates a standard deviation using the mean Tx power calculated in operation 606 and the uplink Tx power statistics. From operation 608, the method 600 proceeds to operation 610, wherein the mRAB decision application 130 calculates the mean Tx power plus one standard deviation.

From operation 610, the method 600 proceeds to operation 612, wherein it is determined if the result of operation 610 (i.e., the calculated mean Tx power plus one standard deviation) meets or exceeds a threshold value. For example, the threshold value may be set to a certain percentage of a maximum uplink Tx power of the MD 102. If the result does not meet or exceed the threshold value, there is sufficient uplink Tx power to support an mRAB. Accordingly, the method 600 proceeds from operation 612 to operation 614, wherein the mRAB decision application 130 allows establishment of an mRAB. From operation 614, the method 600 proceeds to operation 616. The method 600 ends at operation 616. If the result meets or exceeds the threshold value, the method 600 proceeds to operation 618, wherein the mRAB decision application 130 denies establishment of an mRAB. From operation 618, the method 600 proceeds to operation 616, wherein the method 600 ends.

It is contemplated that the threshold value can be generated using a learning model by which the MD 102 adjusts the threshold value depending upon various radio conditions that require more or less power. For example, the MD 102 may require less uplink Tx power to support an mRAB when the MD 102 is located in a rural or suburban environment than when the MD 102 is located in an urban environment due to the prevalence of buildings, traffic, and other obstacles that imped the propagation of radio signals in urban environments. Accordingly, the learning model may adjust the threshold value to require a lower percentage of the maximum uplink Tx power when in certain environments. This may be based at least partially upon location data received from a location component (shown in FIG. 11) of the MD 102 and/or historical power statistics collected over time that may or may not be correlated with location data. It is also contemplated that the threshold value can be generated using a weighting function that utilizes multiple statistics (e.g., uplink Tx power and downlink Rx power), each weighted by a certain factor to calculate a weighted result that is used to determine whether the MD 102 is capable of supporting an mRAB.

Figure 7:
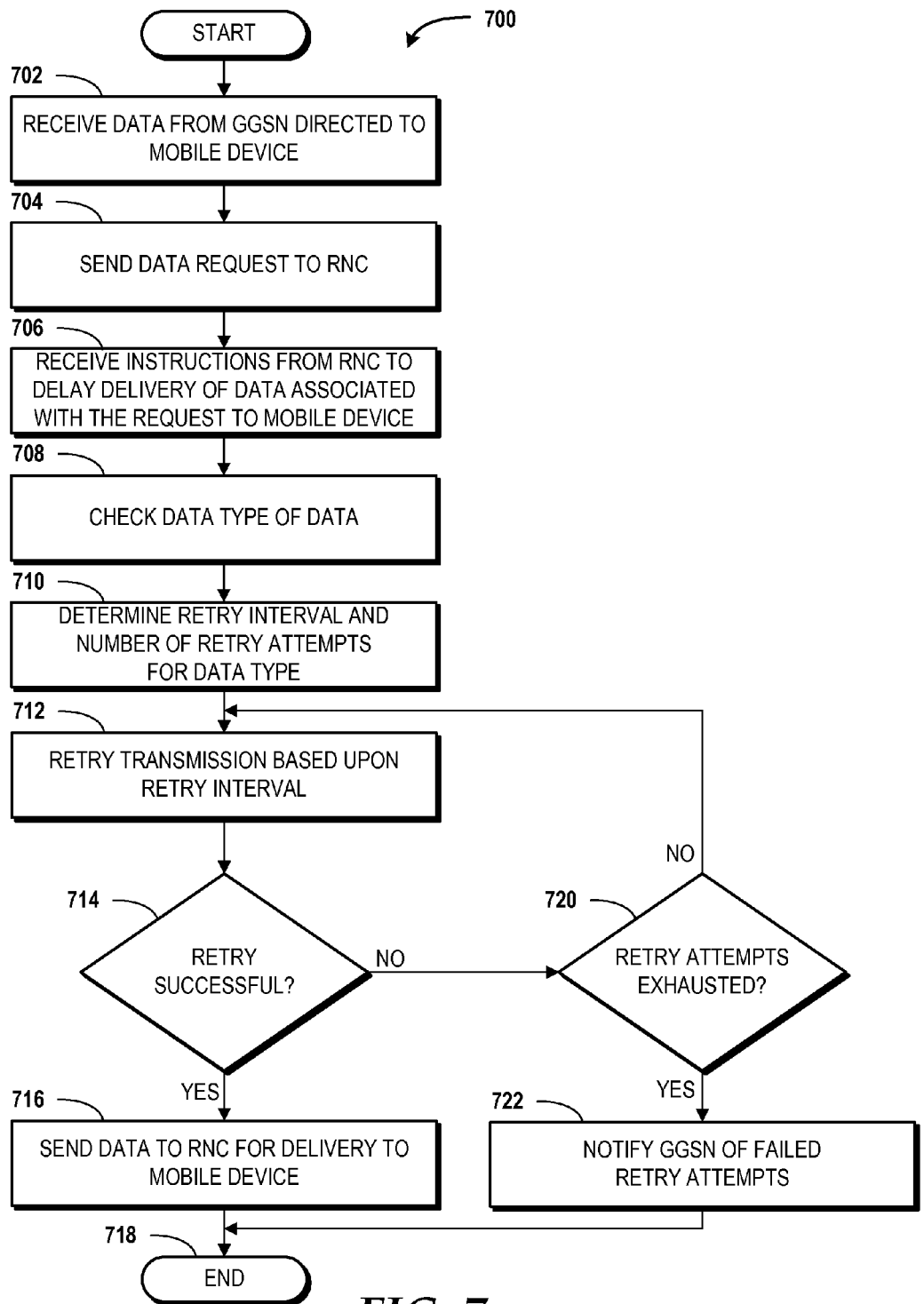
FIG. 7 is a flow diagram showing aspects of a method for operating a serving general packet radio service support node to selectively establish an mRAB, according to an exemplary embodiment.

Turning now to FIG. 7, aspects of a method 700 for operating the SGSN 126 will be described in detail. The method 700 begins and proceeds to operation 702, wherein the SGSN 126 receives data directed to the MD 102 from the GGSN 128. From operation 702, the method 700 proceeds to operation 704, wherein the SGSN 126 sends a data request (e.g., in the form of a PDP context activation request, other message during a PDP context activation procedure, or a message associated with the establishment of a RAB) to the RNC 118.

From operation 704, the method 700 proceeds to operation 706, wherein the SGSN 126 receives instructions from the RNC 118 to delay delivery of data associated with the data request to the MD 102. In some embodiments, the instructions received from the RNC 118 are based upon a notification received by the RNC 118 from the MD 102 indicating that sufficient uplink Tx power is currently not available to establish an mRAB. The notification may be implicit such as by one or more previous attempts to contact the MD 102 to establish a data connection being ignored, or explicit such as by a message received at the RNC 118 from the MD 102. In some embodiments, the RNC 118 determines that the MD 102 is currently not available to establish an mRAB. This may be determined, for example, using a downlink Tx power of the node B 116 to the MD 102 for a current voice call as an estimate of the uplink Tx power of the MD 102.

From operation 706, the method 700 proceeds to operation 708, wherein the SGSN 126 checks the data type of the data received from the GGSN 128. In some embodiments, the SGSN application 134 (shown in FIG. 1) stores a retry interval and a number of retry attempts for various data types. In some embodiments, the retry intervals and/or the number of retry attempts are set by a mobile network operator, an operator of the SGSN 126, a user of the MD 102, or another party. In some embodiments, the retry intervals and/or the number of retry attempts are set according to a priority scheme, wherein certain data types have a higher priority than others. In this manner, a mobile network operator, for example, can prioritize which type(s) of data is sent to a target device when the target device is engaged in a voice call.

From operation 708, the method 700 proceeds to operation 710, wherein the SGSN 126 determines a retry interval based upon the data type determined in operation 708. Operation 710 may be a look-up operation, wherein the SGSN application 134 looks up the retry interval and/or the number of retry attempts associated with the determined data type in a table stored in the SGSN 126. From operation 710, the method 700 proceeds to operation 712, wherein the SGSN 126 retries transmission of the data request to the RNC 118 based upon the retry interval determined in operation 710. The retry interval can be any interval.

From operation 712, the method 700 proceeds to operation 714, wherein it is determined if a retry attempt was successful. If a retry attempt was successful, the method 700 proceeds from operation 714 to operation 716, wherein the SGSN 126 sends the data to the RNC 118 for delivery to the MD 102 via the node B 116. From operation 716, the method 700 proceeds to operation 718. The method 700 ends at operation 718. If a retry attempt was not successful, the method 700 proceeds to operation 720, wherein it is determined if the number of retry attempts has been exhausted. If the number of retry attempts has not been exhausted, the method 700 proceeds to operation 712, wherein the SGSN 126 again retries transmission of the data based upon the retry interval. If the number of retry attempts has been exhausted, however, the method 700 proceeds to operation 722, wherein the SGSN 126 notifies the GGSN 128 of the failed retry attempts. The GGSN may then notify the server 114 or other data source that the data cannot be transmitted to the MD 102. From operation 722, the method 700 proceeds to operation 718, wherein the method 700 ends.

Figure 8:
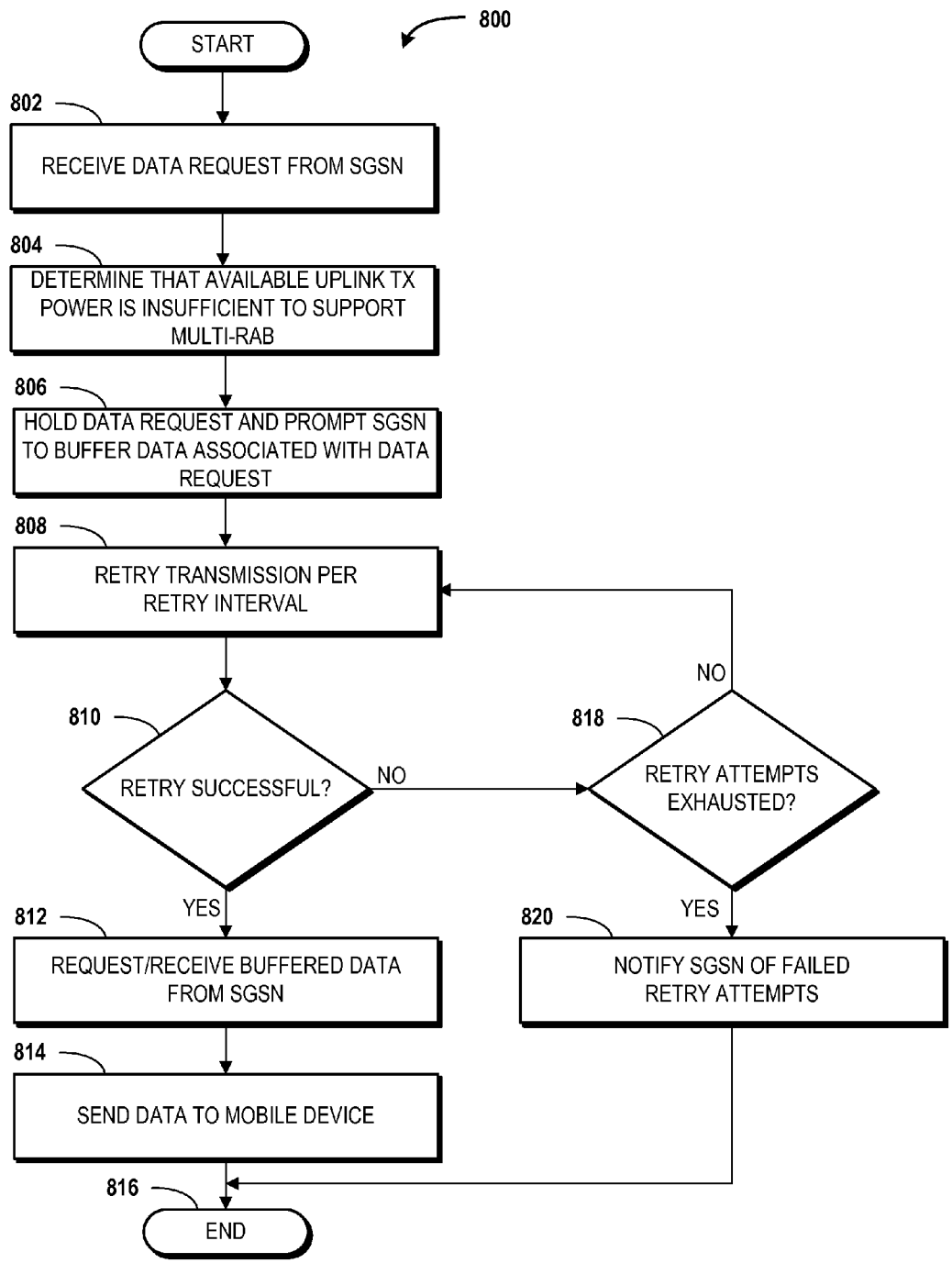
FIG. 8 is a flow diagram showing aspects of a method for operating a radio network controller to selectively establish an mRAB, according to an exemplary embodiment.

Turning now to FIG. 8, aspects of a method 800 for operating the RNC 118 will be described in detail. The method 800 begins and proceeds to operation 802, wherein the RNC 118 receives a data request from the SGSN 126. From operation 802, the method 800 proceeds to operation 804, wherein the RNC 118 determines that the available uplink Tx power of the MD 102 is insufficient to support an mRAB. In some embodiments, this determination is made based upon information received from the MD 102. The information may be implicit such as by one or more previous attempts to contact the MD 102 to establish a data connection being ignored, or explicit such as by a message received from the MD 102 in response to a previous attempt (e.g., a denied PDP context activation request). It should be understood that the previous attempts may be associated with the data request received in operation 802 or another data request received within a predetermined time period of the RNC 118 receiving the data request.

From operation 804, the method 800 proceeds to operation 806, wherein the RNC 118 holds the data request and prompts the SGSN 126 to buffer data associated with the data request. From operation 806, the method 800 proceeds to operation 808, wherein the RNC 118 retries transmission of the data request to the MD 102 based upon a retry interval. The retry interval can be set in the RNC application 132 at any interval. For example, if the average voice call experienced by the RNC 118 is known to be between 100 and 120 seconds, the RNC application 132 can be set with a retry interval of 120 seconds which would, on average, be successful on a second retry attempt. The retry interval may be set by a mobile network operator, an operator of the RNC 118, a user of the MD 102, or another party.

From operation 808, the method 800 proceeds to operation 810, wherein it is determined if a retry attempt was successful. If a retry attempt was successful, the method 800 proceeds from operation 810 to operation 812, wherein the RNC 118 requests and receives the buffered data from the SGSN 126. From operation 812, the method 800 proceeds to operation 814, wherein the RNC 118 sends the data to the MD 102 via the node B 116. From operation 814, the method 800 proceeds to operation 816. The method 800 ends at operation 816. If a retry attempt was not successful, the method 800 proceeds to operation 818, wherein it is determined if a number of retry attempts has been exhausted. If the number of retry attempts has not been exhausted, the method 800 proceeds to operation 808, wherein the RNC 118 again retries transmission of the data request based upon the retry interval. If the number of retry attempts has been exhausted, however, the method 800 proceeds to operation 820, wherein the RNC 118 notifies the SGSN 126 of the failed retry attempts. The SGSN 126 may then notify the GGSN 128 that the data cannot be transmitted to the MD 102. The GGSN 128 may, in turn, notify the server 114 or other data source of the same. From operation 820, the method 800 proceeds to operation 816, wherein the method 800 ends.

Figure 9:
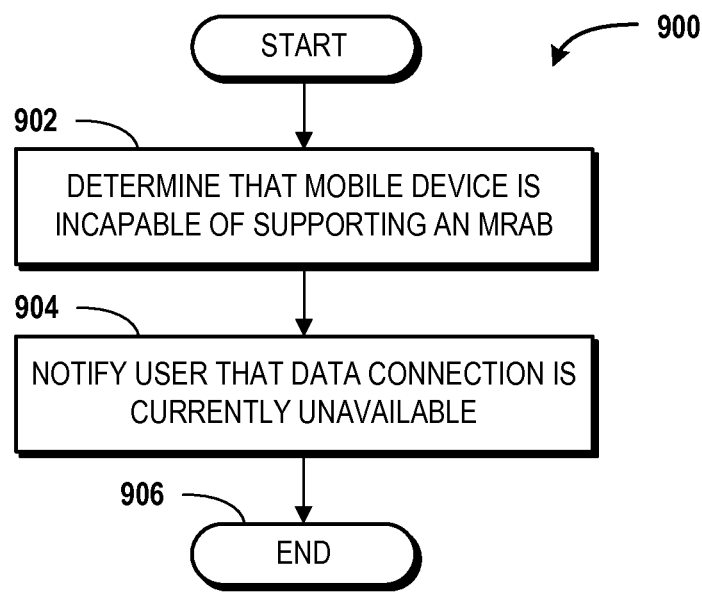
FIG. 9 is a flow diagram showing aspects of a method for notifying a user that a data connection is currently unavailable, according to an exemplary embodiment.

Turning now to FIG. 9, aspects of a method 900 for notifying a user that a data connection is currently unavailable will be described in detail. The method 900 begins and proceeds to operation 902, wherein it is determined that the MD 102 is incapable of supporting an mRAB. This determination may be made based upon any of the applicable methods disclosed herein above.

From operation 902, the method 900 proceeds to operation 904, wherein the MD 102 notifies the user that a data connection is currently unavailable. In some embodiments, the MD 102 notifies the user using visible, audible, and/or tactile notification mechanisms. In particular, the MD 102 may use text, graphics, videos, sounds, music, vibrations, or combinations thereof to notify the user that a data connection is currently unavailable. It is contemplated that the mechanism by which such notifications are presented to the user be configurable by the user, a mobile network operator, a third party (e.g., a device manufacturer or device software developer/distributor), or some combination thereof. Moreover, the notification can be triggered at the operating system or application level. In some embodiments, an operating system or an application receives a trigger to present the notification via the mRAB decision application 130. From operation 904, the method 900 proceeds to operation 906. The method 900 ends at operation 906.

Figure 10:
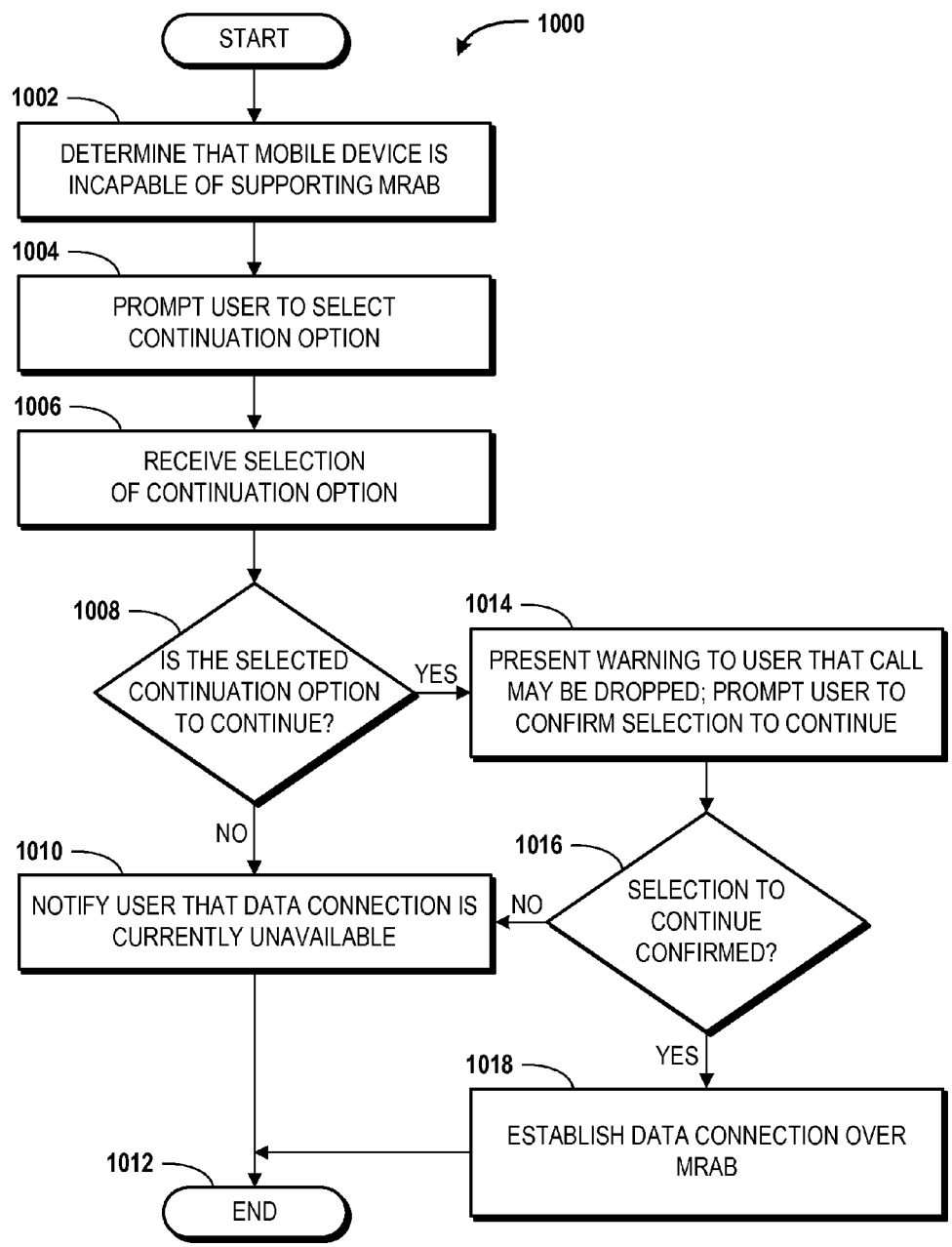
FIG. 10 is a flow diagram showing aspects of a method for providing a user override option if the establishment of an mRAB is denied, according to an exemplary embodiment.

Turning now to FIG. 10, aspects of a method 1000 for providing a user override option will be described in detail. The method 1000 begins and proceeds to operation 1002, wherein it is determined that the MD 102 is incapable of supporting an mRAB. From operation 1002, the method 1000 proceeds to operation 1004, wherein the MD 102 prompts the user to select a continuation option. In the illustrated embodiment, continuation options include an option to continue with a data connection and an option not to continue with a data connection. In other embodiments, the continuation options include selectable options for various uplink and/or downlink data rates, one or more of which may have different power requirements to support. In these embodiments, the mRAB decision application 130 may be configured to suggest a data rate based upon the available uplink Tx power of the MD 102. In some embodiments, a default option (e.g., continue, do not continue, or select a slower data rate that requires less power) is set.

From operation 1004, the method 1000 proceeds to operation 1006, wherein the MD 102 receives a selection of a continuation option. From operation 1006, the method 1000 proceeds to operation 1008, wherein it is determined if the selected continuation option is to continue with the establishment of an mRAB. If the selected continuation option is not to continue, the method 1000 proceeds from operation 1008 to operation 1010, wherein the MD 102 notifies the user that a data connection is currently unavailable. The notification used in operation 1010 may be similar to the notification described above with reference to FIG. 9. From operation 1010, the method 1000 proceeds to operation 1012. The method 1000 ends at operation 1012.

If the selected continuation option is to continue, the method 1000 proceeds from operation 1008 to operation 1014, wherein the MD 102 presents a warning to the user indicating that their call may be dropped should they choose to continue with a data connection. In the illustrated embodiment, at operation 1014, the MD 102 also prompts the user to confirm their selection to continue after presentation of the warning. From operation 1014, the method 1000 proceeds to operation 1016, wherein it is determined if the user has confirmed their selection to continue. If the user does not confirm their selection to continue, the method 1000 proceeds from operation 1016 to operation 1010, wherein the MD 102 notifies the user that a data connection is currently unavailable. From operation 1010, the method 1000 proceeds to operation 1012, wherein the method 1000 ends. If, at operation 1016, the user confirms their selection to continue, the method 1000 proceeds from operation 1016 to operation 1018, wherein a data connection is established over an mRAB. Alternatively, the warning presented in operation 1014 may be presented without prompting the user for confirmation and the method 1000 proceeds automatically from operation 1014 to operation 1018. In any case, from operation 1018, the method 1000 proceeds to operation 1012, wherein the method 1000 ends.

Figure 11:
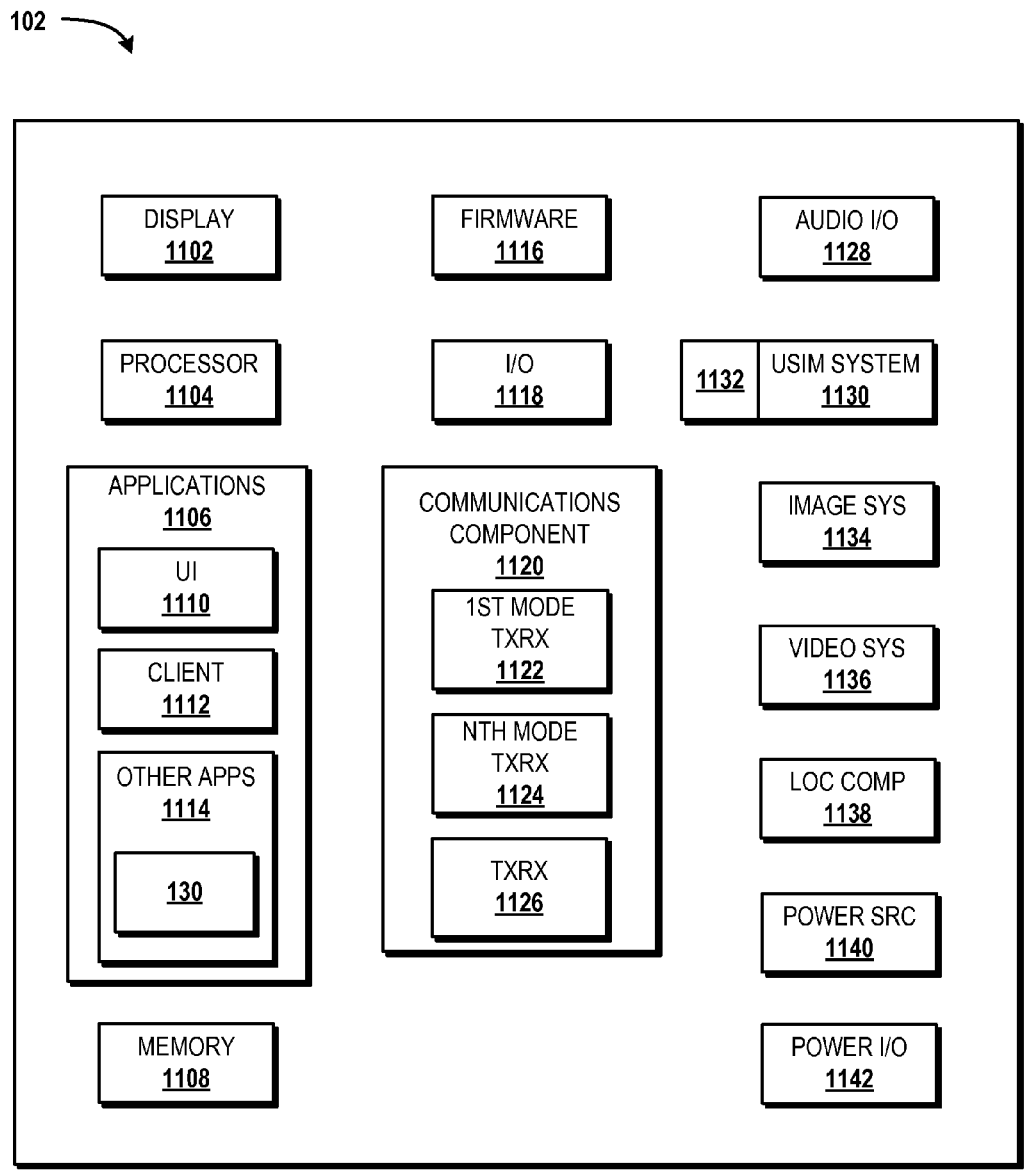
FIG. 11 is a mobile device architecture diagram illustrating an exemplary device hardware and software architecture for a mobile device capable of implementing aspects of the embodiments presented herein.

Turning now to FIG. 11, an exemplary mobile communications device, such as the MD 102, and the components thereof is illustrated, according to an exemplary embodiment. Although connections are not shown between the components illustrated in FIG. 11, the components can interact with each other to carry out device functions. In some embodiments, for example, the components are arranged so as to communicate via one or more busses (not shown). It should be understood that FIG. 11 and the following description are intended to provide a general understanding of a suitable environment in which various aspects of embodiments can be implemented.

As illustrated in FIG. 11, the MD 102 includes a display 1102 for displaying data including, but not limited to, graphical user interface ("GUI") elements, text, images, video, virtual keypads and/or keyboards, messaging data, notification messages, metadata, internet content, device status, time, date, calendar data, device preferences, map and location data, profile selection (e.g., loud or silent mode), and the like. The MD 102 also includes a processor 1104 for processing data and/or executing computer-executable instructions of one or more applications 1106 stored in a memory 1108. In some embodiments, the applications 1106 include a user interface ("UI") application 1110. The UI application 1110 interfaces with a client application 1112 (e.g., an operating system) to facilitate user interaction with device functionality and data. In some embodiments, the client application 1112 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE CORPORATION, and ANDROID OS from GOOGLE INC. These operating systems are merely exemplary of the operating systems that may be used in accordance with the embodiments disclosed herein.

The UI application 1110 aids a user in activating service over-the-air, if applicable, entering message content, viewing received messages, answering/initiating calls, entering/deleting data, entering and setting user IDs and passwords for device access, configuring settings, manipulating address book content and/or settings, multimode interaction, interacting with other applications 1114, and otherwise facilitating user interaction with the client application 1112 and/or the other applications 1114.

In some embodiments, the other applications 1114 include, for example, visual voicemail applications, messaging applications, presence applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The other applications 1114 also include the mRAB decision application 130. The mRAB decision application 130 is configured as described above with reference to the other FIGURES. The applications 1106 are stored in the memory 1108 and/or in a firmware 1116, and are executed by the processor 1104. The firmware 1116 may also store code for execution during device power up and power down operations.

The MD 102 also includes an input/output ("I/O") interface 1118 for the input/output of data such as location information, presence status information, user IDs, passwords, and application initiation (start-up) requests. In some embodiments, the I/O interface 1118 is a hardwire connection such as a universal serial bus ("USB"), mini-USB, micro-USB, audio jack, PS2, IEEE 1394, serial, parallel, Ethernet (RJ48) port, RJ11 port, proprietary port, combinations thereof, or the like. In some embodiments, the MD 102 is configured to synchronize with another device (e.g., a computer) to transfer content stored to/from the MD 102. In some embodiments, the MD 102 is configured to receive updates to one or more of the applications 1106 via the I/O interface 1118. In some embodiments, the I/O interface 1118 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1118 may be used for communications between the MD 102 and a network device or local device instead of, or in addition to, a communications component 1120.

The communications component 1120 interfaces with the processor 1104 to facilitate wireless communications with one or more networks such as the network 100 (shown in FIG. 1) and/or other networks. In some embodiments, other networks include another PLMN while the MD 102 is roaming outside of the network 100. In other embodiments, other networks include networks that utilize non-cellular wireless technologies such as WIFI or WIMAX. In some embodiments, the communications component 1120 includes a multimode communications subsystem for facilitating communications via the network 100 and one or more other networks.

The communications component 1120, in some embodiments, includes one or more transceivers each configured to communicate over the same or a different wireless technology standard. For example, the transceivers of the communications component 1120 may be configured to communicate using Global System for Mobile communications ("GSM"), CDMAONE, CDMA2000, Long Term Evolution ("LTE"), and various other 2G, 2.5G, 3G, 4G, and greater generation technology standards. Moreover, the communications component 1120 may facilitate communications over various channel access methods (which may or may not be used by the aforementioned standards) including, but not limited to, Time Division Multiple Access ("TDMA"), Frequency Division Multiple Access ("FDMA"), W-CDMA, Orthogonal Frequency Division Multiplexing ("OFDM"), Space Division Multiple Access ("SDMA"), and the like. In addition, the communications component 1120 may facilitate data communications using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), and various other current and future wireless data access standards.

In the illustrated embodiment, the communications component 1120 includes a first cellular transceiver 1122 that operates in one mode (e.g., GSM), and an $N^{th}$ cellular transceiver 1124 operates in a different mode (e.g., UMTS). While only two cellular transceivers 1122, 1124 are illustrated, it should be appreciated that more than two transceivers can be included in the communications component 1120.

The illustrated communications component 1120 also includes an alternative communications transceiver 1126 for use by other communications technologies including WIFI, WIMAX, BLUETOOTH, infrared, infrared data association ("IRDA"), near field communications ("NFC"), other RF, combinations thereof, and the like. In some embodiments, the communications component 1120 also facilitates reception from terrestrial radio networks, digital satellite radio networks, internet-based radio service networks, combinations thereof, and the like.

The communications component 1120 processes data from a network such as an internet, an intranet, a home broadband network, a WIFI hotspot, and the like, via an internet service provider ("ISP"), digital subscriber link ("DSL") provider, or broadband provider.

Audio capabilities for the MD 102 may be provided by an audio I/O component 1128 that includes a speaker for the output of audio signals and a microphone to collect audio signals.

The illustrated MD 102 also includes a USIM system 1130 that includes a SIM slot interface 1132 for accommodating a USIM card. In some embodiments, the USIM system 1130 is configured to accept insertion of other SIM cards for access to other network types such as GSM. In other embodiments, the USIM system 1130 is configured to accept multiple SIM cards. In still other embodiments, the USIM system 1130 is configured to accept a universal integrated circuit card ("UICC") with one or more SIM applications stored thereupon.

The MD 102 may also include an image capture and processing system 1134 ("image system"). Photos may be obtained via an associated image capture subsystem of the image system 1134, for example, a camera. The MD 102 may also include a video system 1136 for capturing, processing, recording, and/or modifying video content. Photos and videos obtained using the image system 1134 and the video system 1136, respectively, may be added as message content to a multimedia messaging service ("MMS") message and sent to another mobile device.

The illustrated MD 102 also includes a location component 1138 for sending and/or receiving signals such as global positioning system ("GPS") data, assisted GPS ("A-GPS") data, WIFI/WIMAX and/or cellular network triangulation data, combinations thereof, and the like, for determining a location of the MD 102. The location component 1138 may communicate with the communications component 1120 to retrieve triangulation data for determining a location of the MD 102. In some embodiments, the location component 1138 interfaces with cellular network nodes, telephone lines, satellites, location transmitters and/or beacons, wireless network transmitters and receivers, combinations thereof, and the like. In some embodiments, the location component 1138 includes one or more sensors such as a compass, an accelerometer, and/or a gyroscope to determine the orientation of the MD 102. Using the location component 1138, the MD 102 can generate and/or receive data to identify its location, or transmit data used by other devices to determine the location of the MD 102. The location component 1138 may include multiple components for determining the location and/or orientation of the MD 102.

The illustrated MD 102 also includes a power source 1140, such as one or more batteries and/or other power subsystem (AC or DC). The power source 1140 may interface with an external power system or charging equipment via a power I/O component 1142.

Figure 12:
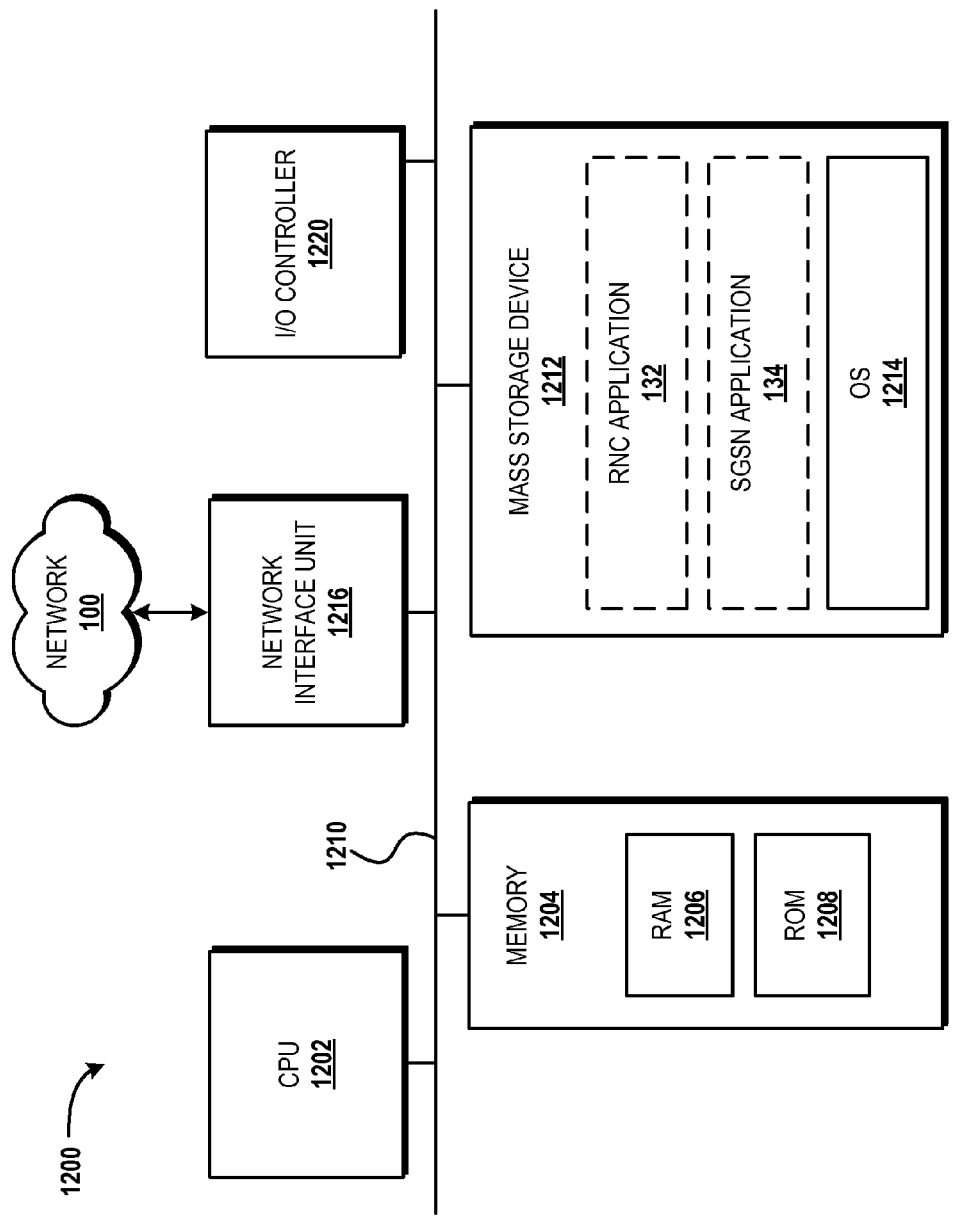
FIG. 12 is a computer architecture diagram illustrating an exemplary computer hardware and software architecture for a computing system capable of implementing aspects of the embodiments presented herein.

Turning now to FIG. 12, an exemplary computer architecture 1200 for a computer system capable of executing the software components described herein will be described in detail. The computer architecture 1200 illustrates an architecture for the RNC 116 and the SGSN 122. The computer architecture 1200 may be utilized to execute any aspects of the software components presented herein.

The illustrated computer architecture 1200 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system containing the basic routines that help to transfer information between elements within the computer architecture 1200, such as during startup, is stored in the ROM 1208. The computer architecture 1200 further includes a mass storage device 1212 for storing an operating system 1214. The mass storage device 1212 also includes one of the RNC application 132 and the SGSN application 134 depending upon whether the computer architecture 1200 is for the RNC 118 or the SGSN 126.

The mass storage device 1212 is connected to the CPU 1202 through a mass storage controller (not shown) connected to the bus 1210. The mass storage device 1212 and its associated computer-readable media provide non-volatile storage for the computer architecture 1200. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes of the claims, the phrase "computer storage medium" and variations thereof, does not include waves, signals, and/or other transitory and/or intangible communication media, per se.

According to various embodiments, the computer architecture 1200 may operate in a networked environment using logical connections to remote computers or network elements through a network such as the network 100. The computer architecture 1200 may connect to the network 100 through a network interface unit 1216 connected to the bus 1210. It should be appreciated that the network interface unit 1216 also may be utilized to connect to other types of networks and remote computer systems. The computer architecture 1200 also may include an input/output controller 1220 for receiving and processing input from a number of other devices, including a keyboard, mouse, electronic stylus, or other input device (not shown in FIG. 12). Similarly, the input/output controller 1220 may provide output to a display screen, a printer, or other type of output device (also not shown in FIG. 12).

It should be appreciated that the software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It is also contemplated that the computer architecture 1200 may not include all of the components shown in FIG. 12, may include other components that are not explicitly shown in FIG. 12, or may utilize an architecture completely different than that shown in FIG. 12.

Based on the foregoing, it should be appreciated that technologies for selective establishment of radio access bearers to support simultaneous voice and data communications in a mobile telecommunications network have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for selectively establishing radio access bearers, the method comprising:
   receiving, at a mobile device, a request to initiate a data session, the mobile device being currently engaged in a voice session;
   in response to receiving the request, determining, at the mobile device, if the mobile device is capable of supporting a radio access bearer configured to simultaneously support the data session and the voice session, wherein determining if the mobile device is capable of supporting the radio access bearer comprises evaluating a risk of dropping the voice session if the radio access bearer is established given a current radio condition being experienced by the mobile device and an importance of data prompting establishment of the data session via the request;
   allowing establishment of the radio access bearer if it is determined that the risk of dropping the voice session is tolerable based upon the importance of the data; and
   denying establishment of the radio access bearer if it is determined that the risk of dropping the voice session is intolerable based upon the importance of the data.

2. The method of claim 1, wherein receiving the request to initiate the data session comprises receiving a device-initiated request to initiate the data session, the device-initiated data request being generated by the mobile device in response to instructions from an application residing on the mobile device.

3. The method of claim 1, wherein receiving the request to initiate the data session comprises receiving a user-initiated request to initiate the data session, the user-initiated data request being generated by the mobile device in response to a direct user input.

4. The method of claim 1, wherein receiving the request to initiate the data session comprises receiving a network-initiated request to initiate the data session, the network-initiated data request being received in response to an entity external to the mobile device taking an action to invoke an operation on the mobile device that at least temporarily requires a data connection.

5. The method of claim 1, further comprising measuring a statistic of the mobile device, and wherein determining if the mobile device is capable of supporting the radio access bearer comprises determining if the mobile device is capable of supporting the radio access bearer is further based at least partially upon the statistic measured by the mobile device and a comparison of the statistic to a thresholding algorithm.

6. The method of claim 5, wherein the statistic comprises at least one of an uplink transmit power statistic, a downlink received power, or a number of power-up commands received from a base station.

7. The method of claim 5, wherein the thresholding algorithm employs a threshold value to which the statistic measured by the mobile device is compared, the threshold value being one of a static threshold value and an adjustable threshold value.

8. The method of claim 7, wherein the adjustable threshold value is determined based upon a learning model by which the mobile device adjusts the threshold value depending upon radio conditions experienced by the mobile device.

9. The method of claim 5, wherein the thresholding algorithm employs a weighting function that utilizes a plurality of statistics comprising the statistic, each of the plurality of statistics being weighted by a certain factor to calculate a weighted result that is used to determine if the mobile device is capable of supporting the radio access bearer.

10. The method of claim 1, wherein determining that the risk of dropping the voice session is one of tolerable and intolerable is based upon priority data provided in a priority data file stored on the mobile device, the priority data file having been received by the mobile device from a mobile network operator serving the mobile device.

11. A method for selectively establishing radio access bearers, the method comprising:
   collecting an uplink transmit power statistic for a mobile device during a voice session occurring over a first radio access bearer established between the mobile device and a mobile telecommunications network;
   receiving a request to initiate a data session between the mobile device and the mobile telecommunications network;
   in response to receiving the request, calculating an available uplink transmit power from the uplink transmit power statistic; and
   determining if a second radio access bearer configured to simultaneously support the voice session and the data session should be established based at least in part upon the available uplink transmit power and a comparison of the available uplink transmit power to a thresholding algorithm, wherein the thresholding algorithm employs a weighting function that utilizes a plurality of statistics comprising the uplink transmit power statistic, each of the plurality of statistics being weighted by a certain factor to calculate a weighted result that is used to determine if the second radio access bearer should be established.

12. The method of claim 11, wherein determining if the second radio access bearer should be established further comprises determining a probability of the voice session being terminated should the second radio access bearer be established.

13. The method of claim 11, wherein determining if the second radio access bearer should be established further comprises evaluating a risk associated with establishing the second radio access bearer.

14. The method of claim 11, wherein determining if the second radio access bearer is to be established further comprises determining if the available uplink transmit power is within a certain percentage of a maximum uplink transmit power of the mobile device.

15. The method of claim 11, wherein determining if the second radio access bearer is to be established further comprises determining if the available uplink transmit power is within a number of decibels of a maximum uplink transmit power of the mobile device.

16. The method of claim 11, wherein the thresholding algorithm employs a threshold value to which the available uplink transmit power is compared, the threshold value being one of a static threshold value and an adjustable threshold value.

17. The method of claim 16, wherein the adjustable threshold value is determined based upon a learning model by which the mobile device adjusts the threshold value depending upon radio conditions experienced by the mobile device.

18. A computer storage medium having computer readable instructions stored thereupon that, when executed by a mobile device, cause the mobile device to perform operations comprising:
   collecting uplink transmit power statistics for the mobile device;
   calculating a mean uplink transmit power from the uplink transmit power statistics;
   calculating a standard deviation from the uplink transmit power statistics;
   calculating a value for the mean uplink transmit power plus the standard deviation;
   determining if the value calculated for the mean uplink transmit power plus the standard deviation at least meets a threshold value;
   allowing establishment of a radio access bearer if the value does not at least meet the threshold value; and
   denying establishment of the radio access bearer if the value at least meets the threshold value.

19. The computer storage medium of claim 18, wherein calculating the mean uplink transmit power from the uplink transmit power statistics comprises calculating the mean uplink transmit power in response to receiving a request to establish a data session.

20. The computer storage medium of claim 18, wherein the threshold value is a static threshold value or an adjustable threshold value, the adjustable threshold value being adjustable based upon a radio condition experienced by the mobile device.

* * * * *